United States Patent
Ying et al.

(10) Patent No.: US 7,415,147 B2
(45) Date of Patent: Aug. 19, 2008

(54) METHOD OF AND SYSTEM FOR DESTREAKING THE PHOTOELECTRIC IMAGE IN MULTI-ENERGY COMPUTED TOMOGRAPHY

(75) Inventors: Zhengrong Ying, Wakefield, MA (US); Ram Naidu, Waban, MA (US); Sergey Simanovsky, Brookline, MA (US); Carl R. Crawford, Brookline, MA (US)

(73) Assignee: Analogic Corporation, Peabody, MA (US)

( * ) Notice: Subject to any disclaimer, the term of this patent is extended or adjusted under 35 U.S.C. 154(b) by 730 days.

(21) Appl. No.: 10/860,984

(22) Filed: Jun. 4, 2004

(65) Prior Publication Data

US 2005/0271293 A1 Dec. 8, 2005

(51) Int. Cl.
*G06K 9/00* (2006.01)
(52) U.S. Cl. .......................... 382/132; 382/154; 378/4
(58) Field of Classification Search ................ 382/100, 382/128, 129, 130, 131–133, 168, 172, 203, 382/254, 255, 274, 275, 276, 288–297, 318, 382/154, 232; 378/4, 21
See application file for complete search history.

(56) References Cited

U.S. PATENT DOCUMENTS

| | | | |
|---|---|---|---|
| 4,029,963 A | 6/1977 | Alvarez et al. | |
| 4,759,047 A | 7/1988 | Donges et al. | |
| 4,884,289 A | 11/1989 | Glockmann et al. | |
| 5,132,998 A | 7/1992 | Tsutsui et al. | |
| 5,182,764 A | 1/1993 | Peschmann et al. | |
| 5,247,561 A | 9/1993 | Kotowski | |
| 5,319,547 A | 6/1994 | Krug et al. | |
| 5,367,552 A | 11/1994 | Peschmann et al. | |
| 5,473,657 A | 12/1995 | McKenna | |
| 5,490,218 A | 2/1996 | Krug et al. | |
| 5,661,774 A | 8/1997 | Gordon et al. | |
| 5,802,134 A * | 9/1998 | Larson et al. | 378/4 |
| 5,881,122 A | 3/1999 | Bailey et al. | |
| 5,887,047 A | 3/1999 | Bailey et al. | |
| 5,901,198 A | 5/1999 | Crawford et al. | |
| 5,909,477 A | 6/1999 | Crawford et al. | |

(Continued)

FOREIGN PATENT DOCUMENTS

DE 3150306 12/1981

OTHER PUBLICATIONS

Robert E. Alvarez and Albert Macovski, "Energy-selective Reconstructions in X-ray Computerized Tomography," Phys. Med. Biol. 1976, vol. 21, No. 5, 733-744.

(Continued)

*Primary Examiner*—Seyed Azarian
(74) *Attorney, Agent, or Firm*—McDermott Will & Emery LLP

(57) ABSTRACT

A method of and a system for destreaking the photoelectric image in multi-energy computed tomography are provided, wherein the photoelectric projections are generated from the projection data acquired using at least two x-ray spectra for scanned objects; wherein a neighboring scheme is provided; the method comprises computing the statistics including mean and standard deviation using the neighboring scheme; calculating an upper limit and a lower limit from the computed statistics; detecting outliers in the photoelectric projections using the upper and lower limits; and replacing values of outliers using the upper or lower limit.

6 Claims, 11 Drawing Sheets

U.S. PATENT DOCUMENTS

| | | | |
|---|---|---|---|
| 5,932,874 A | 8/1999 | Legg et al. | |
| 5,937,028 A | 8/1999 | Tybinkowski et al. | |
| 5,949,842 A * | 9/1999 | Schafer et al. | 378/4 |
| 5,970,113 A | 10/1999 | Crawford et al. | |
| 5,982,843 A * | 11/1999 | Bailey et al. | 378/4 |
| 5,982,844 A * | 11/1999 | Tybinkowski et al. | 378/4 |
| 6,026,143 A | 2/2000 | Simanovsky et al. | |
| 6,026,171 A | 2/2000 | Hiraoglu et al. | |
| 6,035,014 A | 3/2000 | Hiraoglu et al. | |
| 6,067,366 A | 5/2000 | Simanovsky et al. | |
| 6,075,871 A | 6/2000 | Simanovsky et al. | |
| 6,076,400 A | 6/2000 | Bechwati et al. | |
| 6,078,642 A | 6/2000 | Simanovsky et al. | |
| 6,091,795 A | 7/2000 | Schafer et al. | |
| 6,108,396 A | 8/2000 | Bechwati et al. | |
| 6,111,974 A | 8/2000 | Hiraoglu et al. | |
| 6,128,365 A | 10/2000 | Bechwati et al. | |
| 6,195,444 B1 | 2/2001 | Simanovsky et al. | |
| 6,256,404 B1 | 7/2001 | Gordon et al. | |
| 6,272,230 B1 * | 8/2001 | Hiraoglu et al. | 382/100 |
| 6,345,113 B1 | 2/2002 | Crawford et al. | |
| 6,633,684 B1 * | 10/2003 | James | 382/274 |
| 6,687,326 B1 | 2/2004 | Bechwati et al. | |
| 6,721,387 B1 | 4/2004 | Naidu et al. | |

OTHER PUBLICATIONS

L. A. Lehmann, R. E. Alvarez, A. Macovski, W. R. Brody, N. J. Pelc, S. J. Riederer, and A. L. Hall *Generalized Image Combinations In Dual KVP Digital Radiography*, Med. Phys. 8, 659-667 (1981).

K. Chuang and H. K. Huang, *A Fast Dual-Energy Computational Method Using Isotransmission Lines and Tables*, Med. Phys. 14, 186-192 (1987).

Kak and Slaney, Principles of Computerized Tomographic Imaging, Society for Industrial Mathematics, Jul. 1, 2001, ISBN-10: 089871494X, ISBN-13: 978-089874944, pp. 114-127.

* cited by examiner

1

METHOD OF AND SYSTEM FOR DESTREAKING THE PHOTOELECTRIC IMAGE IN MULTI-ENERGY COMPUTED TOMOGRAPHY

RELATED APPLICATIONS

This patent application and/or patents are related to the following U.S. applications and/or issued U.S. patents, of the same assignee as the present application, the contents of which are incorporated herein in their entirety by reference:

"Nutating Slice CT Image Reconstruction Apparatus and Method," invented by Gregory L. Larson, et al., U.S. application Ser. No. 08/831,558, filed on Apr. 9, 1997, now U.S. Pat. No. 5,802,134, issued on Sep. 1, 1998;

"Computed Tomography Scanner Drive System and Bearing," invented by Andrew P. Tybinkowski, et al., U.S. application Ser. No. 08/948,930, filed on Oct. 10, 1997, now U.S. Pat. No. 5,982,844, issued on Nov. 9, 1999;

"Air Calibration Scan for Computed Tomography Scanner with Obstructing Objects," invented by David A. Schafer, et al., U.S. application Ser. No. 08/948,937, filed on Oct. 10, 1997, now U.S. Pat. No. 5,949,842, issued on Sep. 7, 1999;

"Computed Tomography Scanning Apparatus and Method With Temperature Compensation for Dark Current Offsets," invented by Christopher C. Ruth, et al., U.S. application Ser. No. 08/948,928, filed on Oct. 10, 1997, now U.S. Pat. No. 5,970,113, issued on Oct. 19, 1999;

"Computed Tomography Scanning Target Detection Using Non-Parallel Slices," invented by Christopher C. Ruth, et al., U.S. application Ser. No. 08/948,491, filed on Oct. 10, 1997, now U.S. Pat. No. 5,909,477, issued on Jun. 1, 1999;

"Computed Tomography Scanning Target Detection Using Target Surface Normals," invented by Christopher C. Ruth, et al., U.S. application Ser. No. 08/948,929, filed on Oct. 10, 1997, now U.S. Pat. No. 5,901,198, issued on May 4, 1999;

"Parallel Processing Architecture for Computed Tomography Scanning System Using Non-Parallel Slices," invented by Christopher C. Ruth, et al., U.S. application Ser. No. 08/948,697, filed on Oct. 10, 1997, U.S. Pat. No. 5,887,047, issued on Mar. 23, 1999;

"Computed Tomography Scanning Apparatus and Method For Generating Parallel Projections Using Non-Parallel Slice Data," invented by Christopher C. Ruth, et al., U.S. application Ser. No. 08/948,492, filed on Oct. 10, 1997, now U.S. Pat. No. 5,881,122, issued on Mar. 9, 1999;

"Computed Tomography Scanning Apparatus and Method Using Adaptive Reconstruction Window," invented by Bernard M. Gordon, et al., U.S. application Ser. No. 08/949,127, filed on Oct. 10, 1997, now U.S. Pat. No. 6,256,404, issued on Jul. 3, 2001;

"Area Detector Array for Computed Tomography Scanning System," invented by David A Schafer, et al., U.S. application Ser. No. 08/948,450, filed on Oct. 10, 1997, now U.S. Pat. No. 6,091,795, issued on Jul. 18, 2000;

"Closed Loop Air Conditioning System for a Computed Tomography Scanner," invented by Eric Bailey, et al., U.S. application Ser. No. 08/948,692, filed on Oct. 10, 1997, now U.S. Pat. No. 5,982,843, issued on Nov. 9, 1999;

"Measurement and Control System for Controlling System Functions as a Function of Rotational Parameters of a Rotating Device," invented by Geoffrey A. Legg, et al., U.S. application Ser. No. 08/948,493, filed on Oct. 10, 1997, now U.S. Pat. No. 5,932,874, issued on Aug. 3, 1999;

2

"Rotary Energy Shield for Computed Tomography Scanner," invented by Andrew P. Tybinkowski, et al., U.S. application Ser. No. 08/948,698, filed on Oct. 10, 1997, now U.S. Pat. No. 5,937,028, issued on Aug. 10, 1999;

"Apparatus and Method for Detecting Sheet Objects in Computed Tomography Data," invented by Muzaffer Hiraoglu, et al., U.S. application Ser. No. 09/022,189, filed on Feb. 11, 1998, now U.S. Pat. No. 6,111,974, issued on Aug. 29, 2000;

"Apparatus and Method for Eroding Objects in Computed Tomography Data," invented by Sergey Simanovsky, et al., U.S. application Ser. No. 09/021,781, filed on Feb. 11, 1998, now U.S. Pat. No. 6,075,871, issued on Jun. 13, 2000;

"Apparatus and Method for Combining Related Objects in Computed Tomography Data," invented by Ibrahim M. Bechwati, et al., U.S. application Ser. No. 09/022,060, filed on Feb. 11, 1998, now U.S. Pat. No. 6,128,365, issued on Oct. 3, 2000;

"Apparatus and Method for Detecting Sheet Objects in Computed Tomography Data," invented by Sergey Simanovsky, et al., U.S. application Ser. No. 09/022,165, filed on Feb. 11, 1998, now U.S. Pat. No. 6,025,143, issued on Feb. 15, 2000;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998, now U.S. Pat. No. 6,076,400, issued on Jun. 20, 2000;

"Apparatus and Method for Correcting Object Density in Computed Tomography Data," invented by Ibrahim M. Bechwati, et al., U.S. application Ser. No. 09/022,354, filed on Feb. 11, 1998, now U.S. Pat. No. 6,108,396, issued on Aug. 22, 2000;

"Apparatus and Method for Density Discrimination of Objects in Computed Tomography Data Using Multiple Density Ranges," invented by Sergey Simanovsky, et al., U.S. application Ser. No. 09/021,889, filed on Feb. 11, 1998, now U.S. Pat. No. 6,078,642, issued on Jun. 20, 2000;

"Apparatus and Method for Detection of Liquids in Computed Tomography Data," invented by Muzaffer Hiraoglu, et al., U.S. application Ser. No. 09/022,064, filed on Feb. 11, 1998, now U.S. Pat. No. 6,026,171, issued on Feb. 15, 2000;

"Apparatus and Method for Optimizing Detection of Objects in Computed Tomography Data," invented by Muzaffer Hiraoglu, et al., U.S. application Ser. No. 09/022,062, filed on Feb. 11, 1998, now U.S. Pat. No. 6,272,230, issued on Aug. 7, 2001;

"Multiple-Stage Apparatus and Method for Detecting Objects in Computed Tomography Data," invented by Muzaffer Hiraoglu, et al., U.S. application Ser. No. 09/022,164, filed on Feb. 11, 1998, now U.S. Pat. No. 6,035,014, issued on Mar. 7, 2000;

"Apparatus and Method for Detecting Objects in Computed Tomography Data Using Erosion and Dilation of Objects," invented by Sergey Simanovsky, et al., U.S. application Ser. No. 09/022,204, filed on Feb. 11, 1998, now U.S. Pat. No. 6,067,366, issued on May 23, 2000;

"Apparatus and method for processing object data in computed tomography data using object projections," invented by Carl R. Crawford, et al, U.S. application Ser. No. 09/228,379, filed on Jan. 12, 1999, now U.S. Pat. No. 6,345,113, issued on Feb. 5, 2002;

"Apparatus and method for detecting concealed objects in computed tomography data," invented by Sergey Simanovsky, et al., U.S. application Ser. No. 09/228,380, filed on Jan. 12, 1999, now U.S. Pat. No. 6,195,444, issued on Feb. 27, 2001;

"Method of and system for correcting scatter in a computed tomography scanner," invented by Ibrahim M. Bechwati, et al, U.S. application Ser. No. 10/121,466, filed on Apr. 11, 2002, now U.S. Pat. No. 6,687,326, issued on Feb. 3, 2004;

"Method of and system for reducing metal artifacts in images generated by x-ray scanning devices," invented by Ram Naidu, et al, U.S. application Ser. No. 10/171,116, filed on Jun. 13, 2002, now U.S. Pat. No. 6,721,387, issued on Apr. 13, 2004;

"Decomposition of Multi-Energy Scan Projections using Multi-Step Fitting," invented by Ram Naidu, et al, U.S. application Ser. No. 10/611,572, filed on Jul. 1, 2003;

"Method of and system for computing effective atomic number image in multi-energy computed tomography," invented by Zhengrong Ying, et al, U.S. application Ser. No. 10/850,910, filed on May 21, 2004;

"Method of and system for adaptive scatter correction in multi-energy computed tomography," invented by Zhengrong Ying, et al, U.S. application Ser. No. 10/853,942, filed on May 26, 2004.

FIELD OF THE DISCLOSURE

The present disclosure relates to systems and methods for processing projection data in a computed tomography scanner, and more particularly to a method of and a system for destreaking the photoelectric projection data in a multi-energy computed tomography scanner.

BACKGROUND OF THE DISCLOSURE

Various X-ray baggage scanning systems are known for detecting the presence of explosives and other prohibited items in baggage, or luggage, prior to loading the baggage onto a commercial aircraft. A common technique of measuring a material's density is to expose the material to X-rays and to measure the amount of radiation absorbed by the material, the absorption being indicative of the density. Since many explosive materials may be characterized by a range of densities differentiable from that of other items typically found in baggage, explosives are generally amenable to detection by X-ray equipment.

Most X-ray baggage scanning systems in use today are of the "line scanner" type and include a stationary X-ray source, a stationary linear detector array, and a conveyor belt for transporting baggage between the source and detector array as the baggage passes through the scanner. The X-ray source generates an X-ray beam that passes through and is partially attenuated by the baggage and is then received by the detector array. During each measuring interval the detector array generates data representative of the integral of density of the planar segment of the baggage through which the X-ray beam passes, and this data is used to form one or more raster lines of a two-dimensional image. As the conveyor belt transports the baggage past the stationary source and detector array, the scanner generates a two-dimensional image representative of the density of the baggage, as viewed by the stationary detector array. The density image is typically displayed for analysis by a human operator.

Techniques using dual energy X-ray sources are known for providing additional information about a material's characteristics, beyond solely a density measurement. Techniques using dual energy X-ray sources involve measuring the X-ray absorption characteristics of a material for two different energy levels of X-rays. Depending upon the calibration of the scanner, dual energy measurements provide an indication of dual parameters of the material being scanned. For example, at one calibration setting, the dual parameters can be chosen to be the material's effective atomic number (Z is denoted as "effective atomic number") and the material's density. At another calibration setting, the dual parameters can be chosen to be the material's Photoelectric coefficients and the material's Compton coefficients. At yet another calibration setting, the dual parameters can be chosen to be an amount of a first material present (e.g., plastic) and an amount of a second material present (e.g., aluminum). Dual energy X-ray techniques for energy-selective reconstruction of X-ray Computer Tomography (hereinafter referred to as CT) images are described, for example, in Robert E. Alvarez and Albert Macovski, "Energy-selective Reconstructions in X-ray Computerized Tomography," Phys. Med. Biol. 1976, Vol. 21, No. 5, 733-744; and U.S. Pat. Nos. 4,029,963 and 5,132,998. One algorithm used to generate such dual parameters from dual energy X-ray projection data is known as the Alvarez/Macovski Algorithm (hereinafter referred to as AMA). Others are known in the art.

One proposed use for such dual energy techniques has been in connection with a baggage scanner for detecting the presence of explosives in baggage. Explosive materials are generally characterized by a known range of atomic numbers and are therefore amenable to detection by such dual energy X-ray sources. One such dual energy source is described in U.S. Pat. No. 5,661,774, entitled "Improved Dual Energy Power Supply," assigned to the present assignee and incorporated by reference. Other dual energy sources are known in the art.

Most explosives capable of significantly damaging an aircraft are sufficiently large in length, width, and height so as to be readily detectable by an X-ray scanner system regardless of the explosive's orientation within the baggage. Plastic explosives, however, present a particular challenge to baggage scanning systems. Due to their moldable nature, plastic explosives may be formed into geometric shapes that are difficult to detect. A plastic explosive powerful enough to damage an aircraft may be formed into a relatively thin sheet that is extremely small in one dimension and is relatively large in the other two dimensions. The detection of plastic explosives may be difficult because it may be difficult to see the explosive material in the image, particularly when the material is disposed so that the thin sheet is parallel to the direction of the X-ray beam as the sheet passes through the system.

Thus, detection of suspected baggage requires very attentive operators. The requirement for such attentiveness can result in greater operator fatigue, and fatigue as well as any distractions can result in a suspected bag passing through the system undetected. Accordingly, a great deal of effort has been made to design a better baggage scanner. Such designs, for example, have been described in U.S. Pat. No. 4,759,047 (Donges et al.); U.S. Pat. No. 4,884,289 (Glockmann et al.); U.S. Pat. No. 5,132,988 (Tsutsui et al.); U.S. Pat. No. 5,182,764 (Peschmann et al.); U.S. Pat. No. 5,247,561 (Kotowski); U.S. Pat. No. 5,319,547 (Krug et al.); U.S. Pat. No. 5,367,552 (Peschmann et al.); (Krug et al.) and German Offenlegungsschrift DE 31 503 06 A1 (Heimann GmbH).

At least one of these designs, described in U.S. Pat. No. 5,182,764 (Peschmann et al.) and U.S. Pat. No. 5,367,552 (Peschmann et al.) (hereinafter the '764 and '552 patents), has been commercially developed and is referred to hereinafter as the "Invision Machine." The Invision Machine includes a CT scanner of the third generation type, which typically includes an X-ray source and an X-ray detector system secured respectively to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

The detector system can include a linear array of detectors disposed as a single row in the shape of a circular arc having a center of curvature at the focal spot of the X-ray source, i.e., the point within the X-ray source from which the X-rays emanate. The X-ray source generates a fan shaped beam, or fan beam, of X-rays that emanates from the focal spot, passes through a planar imaging field, and is received by the detectors. The CT scanner includes a coordinate system defined by X-, Y- and Z-axes, wherein the axes intersect and are all normal to one another at the center of rotation of the disk as the disk rotates about the rotation axis. This center of rotation is commonly referred to as the "isocenter." The Z-axis is defined by the rotation axis and the X- and Y-axes are defined by and lie within the planar imaging field. The fan beam is thus defined as the volume of space defined between a point source, i.e., the focal spot, and the receiving surfaces of the detectors of the detector array exposed to the X-ray beam. Because the dimension of the receiving surfaces of the linear array of detectors is relatively small in the Z-axis direction the fan beam is designed to be relatively thin in the Z-axis direction. Each detector generates an output signal representative of the intensity of the X-rays incident on that detector. Since the X-rays are partially attenuated by all the mass in their path, the output signal generated by each detector is representative of the density of all the mass disposed in the imaging field between the X-ray source and that detector.

As the disk rotates, the detector array is periodically sampled, and for each measuring interval each of the detectors in the detector array generates an output signal representative of the density of a portion of the object being scanned during that interval. The collection of all of the output signals generated by all the detectors in a single row of the detector array for any measuring interval is referred to as a "projection," or equivalently as a "view," and the angular orientation of the disk (and the corresponding angular orientations of the X-ray source and the detector array) during generation of a projection is referred to as the "projection angle." At each projection angle, the path of the X-rays from the focal spot to each detector, called a "ray," increases in cross section from an appropriate point source to the receiving surface area of the detector, and thus is thought to magnify the density measurement because the receiving surface area of the detector area is larger than any cross sectional area of the object through which the ray passes.

As the disk rotates around the object being scanned, the scanner generates a plurality of projections at a corresponding plurality of projection angles. Using well known algorithms a CT image of the object may be generated from all the projection data collected at each of the projection angles. The CT image is representative of the density of a two dimensional "slice" of the object through which the fan beam has passed during the rotation of the disk through the various projection angles. The resolution of the CT image is determined in part by the width of the receiving surface area of each detector in the plane of the fan beam, the width of the detector being defined herein as the dimension measured in the same direction as the width of the fan beam, while the length of the detector is defined herein as the dimension measured in a direction normal to the fan beam parallel to the rotation or Z-axis of the scanner. In general, the resolution of the CT image is inversely proportional to the width of the receiving surface of each detector in the plane of the fan beam.

Referring to the drawings, FIGS. 1, 2 and 3 show perspective, end cross-sectional and radial cross-sectional views, respectively, of a typical baggage scanning system 100, which includes a conveyor system 110 for continuously conveying baggage or luggage 112 in a direction indicated by arrow 114 through a central aperture of a CT scanning system 120. The conveyor system includes motor driven belts for supporting the baggage. Conveyer system 110 is illustrated as including a plurality of individual conveyor sections 122; however, other forms of conveyor systems may be used.

The CT scanning system 120 includes an annular shaped rotating platform, or disk, 124 disposed within a gantry support 125 for rotation about a rotation axis 127 (shown in FIG. 3) that is preferably parallel to the direction of travel 114 of the baggage 112. Disk 124 is driven about rotation axis 127 by any suitable drive mechanism, such as a belt 116 and motor drive system 118, or other suitable drive mechanism, such as the one described in U.S. Pat. No. 5,473,657 issued Dec. 5, 1995 to Gilbert McKenna, entitled "X-ray Tomographic Scanning System," which is assigned to the present assignee and, which is incorporated herein in its entirety by reference. Rotating platform 124 defines a central aperture 126 through which conveyor system 110 transports the baggage 112.

The system 120 includes an X-ray tube 128 and a detector array 130 which are disposed on diametrically opposite sides of the platform 124. The detector array 130 is preferably a two-dimensional array, such as the array described in U.S. Pat. No. 6,091,795 entitled, "Area Detector Array for Computed Tomography Scanning System." Other suitable arrays are known in the art. The system 120 further includes a data acquisition system (DAS) 134 for receiving and processing signals generated by detector array 130, and an X-ray tube control system 136 for supplying power to, and otherwise controlling the operation of, X-ray tube 128. The system 120 is also preferably provided with a computerized system (not shown) for processing the output of the data acquisition system 134 and for generating the necessary signals for operating and controlling the system 120. The computerized system can also include a monitor for displaying information including generated images. System 120 also includes shields 138, which may be fabricated from lead, for example, for preventing radiation from propagating beyond gantry 125.

The X-ray tube 128 may generate a pyramidally shaped beam, often referred to as a "cone beam," 132 of X-rays that pass through a three dimensional imaging field, through which conveying system 110 transports baggage 112. After passing through the baggage disposed in the imaging field, detector array 130 receives cone beam 132 and generates signals representative of the densities of exposed portions of baggage 112. The beam therefore defines a scanning volume of space. Platform 124 rotates about its rotation axis 127, thereby transporting X-ray source 128 and detector array 130 in circular trajectories about baggage 112 as the conveyor system 110 continuously transports baggage through central aperture 126, so as to generate a plurality of projections at a corresponding plurality of projection angles. When dual energy scanning mode is configured, the control system 136 supplies modulated high voltages with respect to alternating projection angles to the X-ray tube 128. The detector array 130 then receives data corresponding to high energy and low energy X-ray spectra in alternating projection angles.

Post-reconstruction analysis and pre-reconstruction analysis are the two prior art techniques generally recognized for using dual energy X-ray sources in materials analysis (e.g., in a baggage scanner for detecting the presence of explosives in baggage). In post-reconstruction analysis, the signal flow is as shown in FIG. 4. The scanner 120 is typically similar to the one shown in FIGS. 1-3 and has an X-ray source capable of producing a fan or cone beam at two distinct energy levels (i.e., dual energy). The DAS 134 gathers signals generated by detector array 130 at discrete angular positions of the rotating platform 124, and passes the signals to the pre-processing unit 206. The pre-processing unit 206 re-sorts the data it receives from the DAS 134 in order to optimize the sequence for the subsequent mathematical processing. The pre-processing unit 206 also corrects the data from the DAS 134 for detector temperature, intensity of the primary beam, gain and offset, and other deterministic errors. Finally, the pre-processing unit 206 extracts data corresponding to high-energy views and routes it to a high energy path 208, and routes the data corresponding to low-energy views to a low energy path 210. A first reconstruction computer 218 receives the projection data from the high-energy path 208 and generates a CT image $I_H$ 226 corresponding to the high-energy series of projections. A second reconstruction computer 220 receives the projection data from the low-energy path 210 and generates a CT image $I_L$ 224 corresponding to the low-energy series of projections. A post-processing unit 230 receives the high energy CT image 226 and the low-energy CT image 224 and performs voxel-by-voxel processing to yield the effective atomic number (Z is denoted as effective atomic number) image $I_z$ 232. The Z image 232 and the high energy CT image 226 can be provided to operators on a display 240, and both images can be used for automatic explosive detection in 238 as well. The images from the post-reconstruction analysis usually do not yield accurate estimates of the material's effective atomic number, and suffer low SNR (Signal to Noise Ratio) and many artifacts as well.

In pre-reconstruction analysis, the signal flow is as shown in FIG. 5. As is described herein for pre-reconstruction analysis, the dual energy decomposition computer 212 receives the projection data on the high energy path 208 and the low energy path 210 and performs the Alvarez/Macovski Algorithm to produce a first stream of projection data $A_c$ 214, which is dependent on a first parameter of the material being scanned and a second stream of projection data $A_p$ 216, which is dependent on a second parameter of the material scanned. The first material parameter is often the Compton coefficient $\alpha_c$, and the second material parameter is often the photoelectric coefficient $\alpha_p$. A first reconstruction computer 219 receives the first stream of projection data 214 and generates a Compton image $I_c$ 227 from the series of projections corresponding to the first material parameter. A second reconstruction computer 221 receives the second stream of projection data 216 and generates a photoelectric image $I_p$ 225 from the series projections corresponding to the second material parameter. The third reconstruction computer 218 receives the stream of projection data 208 and generates a CT image $I_H$ 226. The two images 225 and 227 are processed in the post-processing unit 230 to yield a Z image $I_z$ 232. The CT image 226 and the Z image 232 can be provided to operators on a display 240, and both images can be used for automatic explosive detection in 238 as well. The pre-reconstruction analysis yields better estimates of material's effective atomic number than the post-reconstruction analysis. However the pre-reconstruction analysis requires one more reconstruction computer than the post-reconstruction analysis.

Various approaches have been used for decomposition of the input projection data $P_L$ and $P_H$ into Compton projections $A_c$ and photoelectric projections $A_p$. For example, the AMA method approximates $P_L$ and $P_H$ using polynomial functions in terms of $A_c$ and $A_p$. The coefficients of the polynomial functions are determined through a calibration procedure as follows. By measuring the projection values of the combination of various thicknesses of two known materials, the coefficients can be calculated through a polynomial least squares fitting between the measured and modeled $P_L$ and $P_H$. Once the coefficients of the polynomial functions are determined, the decomposition of the Compton and Photoelectric projections $A_c$ and $A_p$ from projections $P_L$ and $P_H$ is usually solved using the Newton-Raphson method.

Another prior art method of performing decomposition is the direct approximation method, discussed in L. A. Lehmann, R. E. Alvarez, A. Macovski, W. R. Brody, N. J. Pelc, S. J. Riederer, and A. L. Hall, *Generalized Image Combinations In Dual KVP Digital Radiography*, Med. Phys. 8, 659-667 (1981). In the direct approximation method, $A_c$ and $A_p$ are approximated as polynomial functions in terms of $P_L$ and $P_H$. The coefficients of the polynomial functions in the direct approximation method are determined through a calibration procedure by measuring the projection values of the combination of various thicknesses of two known materials.

In yet another prior art method, decomposition is accomplished using iso-transmission lines, described K. Chuang and H. K. Huang, *A Fast Dual-Energy Computational Method Using Isotransmission Lines and Tables*, Med. Phys. 14, 186-192 (1987). According to this method, for a given projection value, an iso-transmission line is represented by a linear equation in two basis functions. The iso-transmission line method requires a large amount of calibration data. Further, the iso-transmission line becomes increasingly nonlinear as the projection value increases. In such a situation, the linear equations are not valid and the method causes large approximation errors.

The pre-reconstruction analysis usually yields better estimates of the material's effective atomic number than the post-reconstruction analysis. However, the pre-reconstruction analysis as shown in FIG. 5 requires one more reconstruction computer than the post-reconstruction analysis as shown in FIG. 4. Note that the reconstruction computers are the most expensive parts among all the subsystems for processing projection data from DAS 134 to post-processing 230.

The effective atomic number (Z) is the estimate of the hypothetical single element of the same mass density that will give the same X-ray attenuation as the substance being evaluated. In the pre-reconstruction analysis, the Z images are derived from reconstructed Compton images and photoelectric images with the pre-reconstruction dual energy decomposition algorithms, such as in AMA method.

The photoelectric image $I_p$ 225 has streak artifacts due to the large dynamic range of the photoelectric coefficient. For example the photoelectric coefficient for most plastics is about 3000 keV$^3$/cm, and is 1,600,000 keV$^3$/cm for iron. Therefore, objects with large photoelectric coefficients generate streaks and affect the measurements over the objects with small photoelectric coefficients when they are nearby during scanning.

The photoelectric image $I_p$ 225 also has a low Signal to Noise Ratio (SNR), because the photoelectric effect is a small part of the interactions between an X-ray beam and materials for the photon energies of interest in baggage screening. For example, the photoelectric effect only accounts for about 2% of the total X-ray attenuation for water at 80 keV.

The artifacts and noise in the photoelectric image $I_p$ 225 propagate to the Z image $I_z$ 232, and deteriorate the visual effect in displaying the image and, thus, degrade the threat detection performance.

SUMMARY OF THE DISCLOSURE

In accordance with the present disclosure, an algorithm for destreaking the photoelectric image in multi-energy computed tomography is provided. The algorithm reduces the streak artifacts and improves the SNR (Signal to Noise Ratio) of the photoelectric image, resulting in better Z (effective atomic number) measurement for threat detection and improved Z image quality for displaying.

In accordance with one aspect of the present disclosure, the photoelectric projections are generated using methods described in the assignees' "Method of and system for computing effective atomic number image in multi-energy computed tomography" by Zhengrong Ying, et. al. U.S. application Ser. No. 10/850,910, filed on May 21, 2004, incorporated herein by reference, and in the assignees' "Decomposition of Multi-Energy Scan Projections using Multi-Step Fitting" by Ram Naidu, et. al. U.S. application Ser. No. 10/611,572, filed on Jul. 1, 2003, incorporated herein by reference.

In accordance with one aspect of the present disclosure, the destreaking algorithm is performed on the photoelectric projections, and operated along three dimensional indexes including detector row, detector column and view angles.

In one embodiment of the present disclosure, a six-surface-neighbor scheme is used to compute the statistics of the neighbors. Other neighboring schemes, such as an eight-corner-neighbor scheme, a 12-edge-nieghbor scheme, and an all 26 neighbors within a 3 by 3 by 3 cube can also be used.

In another embodiment of the present disclosure, statistics such as the mean and the standard deviation of the neighbors defined in the neighboring scheme are computed. Other statistics such as the maximum and the minimum of the neighbors can also be calculated and used for detecting outliers.

In accordance with the present disclosure, an outlier is detected if the photoelectric projection value is outside the range defined by an upper limit and a lower limit, which are computed from the mean and standard deviation of the neighbors. In one embodiment, the detected outliers are replaced with the upper or lower limit. Other values including the mean of the neighbors can also be used for replacement too. In another embodiment, the photoelectric projections which are not outliers do not change values.

In accordance with the present disclosure, the destreaking algorithm can be applied to the photoelectric projections recursively a plurality of times to yield desired results.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE PREFERRED EMBODIMENTS

Figure 1:
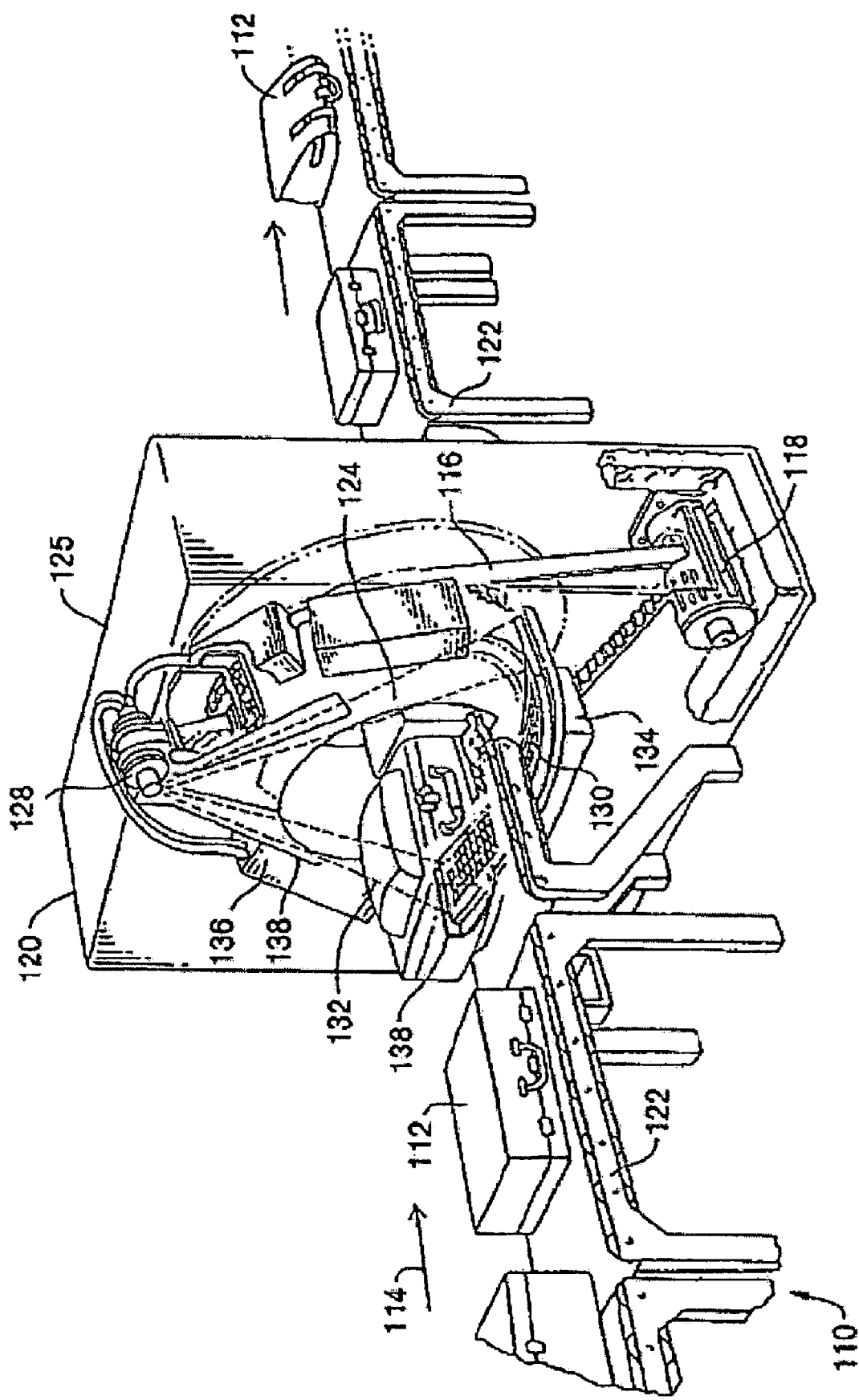
FIG. 1 is a perspective view of a baggage scanning system, known in the prior art.
Figure 6:
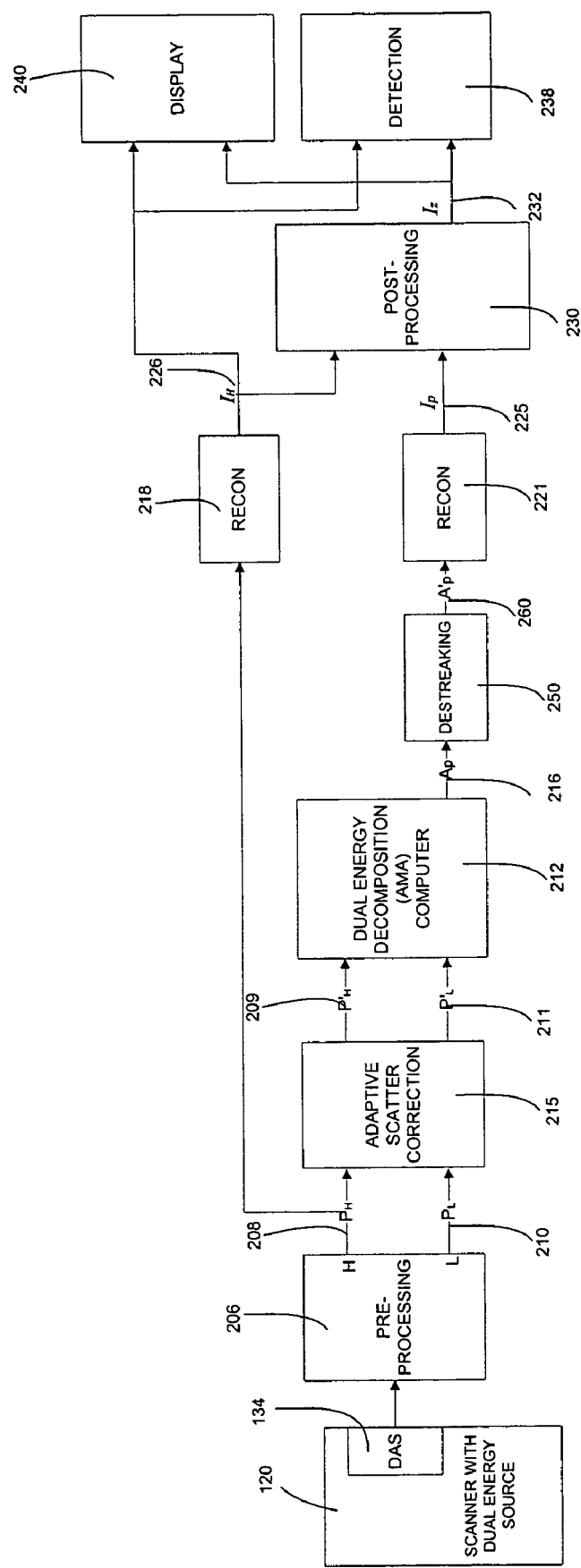
FIG. 6 is a signal flow diagram of a system, like FIG. 5, capable of performing pre-reconstruction analysis of the present disclosure, useful in the system of FIG. 1.

FIG. 6 illustrates the signal and data flow of the scanner system for explosive detection for the checked baggage for an airport of the present disclosure. The scanner 120 is typically similar to the one shown in FIG. 1 and has an X-ray source capable of producing a fan beam at two distinct energy levels (i.e., dual energy). The DAS 134 gathers signals generated by detector array 130 at discrete angular positions of the rotating platform 124, and passes the signals to the pre-processing unit 206. The pre-processing unit 206 re-sorts the data it receives from the DAS 134 in order to optimize the sequence for the subsequent mathematical processing. The pre-processing unit 206 also corrects the data from the DAS 134 for detector temperature, intensity of the primary beam, gain and offset, and other deterministic error factors. Finally, the pre-processing unit 206 extracts data corresponding to high-energy views and routes it to a high energy path 208, and routes the data corresponding to low-energy views to a low energy path 210. The adaptive scatter correction module 215 receives the projection data on the high energy path 208 and the low energy path 210 and performs scatter correction, as described in the assignees' "Method of and system for adaptive scatter correction in multi-energy computed tomography" by Zhengrong Ying, et. al. U.S. application Ser. No. 10/853,942, filed on May 26, 2004; incorporated herein by reference, to produce the scatter corrected high energy projections 209 and low energy projections 211. The dual energy decomposition computer 212 receives the scatter corrected high energy projections 209 and low energy projections 211 and performs a dual energy decomposition to produce photoelectric projections 216. The destreaking unit 250 (described in greater detail hereinafter) performs a destreaking algorithm on the photoelectric projections 216 and outputs the destreaked photoelectric projections 260. A first reconstruction computer 221 receives the stream of the destreaked photoelectric projection data 260 and generates a photoelectric image $I_p$ 225. The second reconstruction computer 218 receives the stream of projection data 208 and generates a CT image $I_H$ 226. These two images 225 and 226 are processed in the post-processing unit 230 to yield a Z image $I_z$. The display 240 displays the CT image 226 and Z image 232 to operators, and the detection module 238 uses the Z image 232 and the CT image 226 for automatic explosive detection. In the above system, CT images are used to replace Compton images in computing Z images to reduce the computational cost as described the assignees' "Method of and system for computing effective atomic number image in multi-energy computed tomography" by Zhengrong Ying, et. al. U.S. application Ser. No. 10/850,910, filed on May 21, 2004, incorporated herein by reference.

Figure 2:
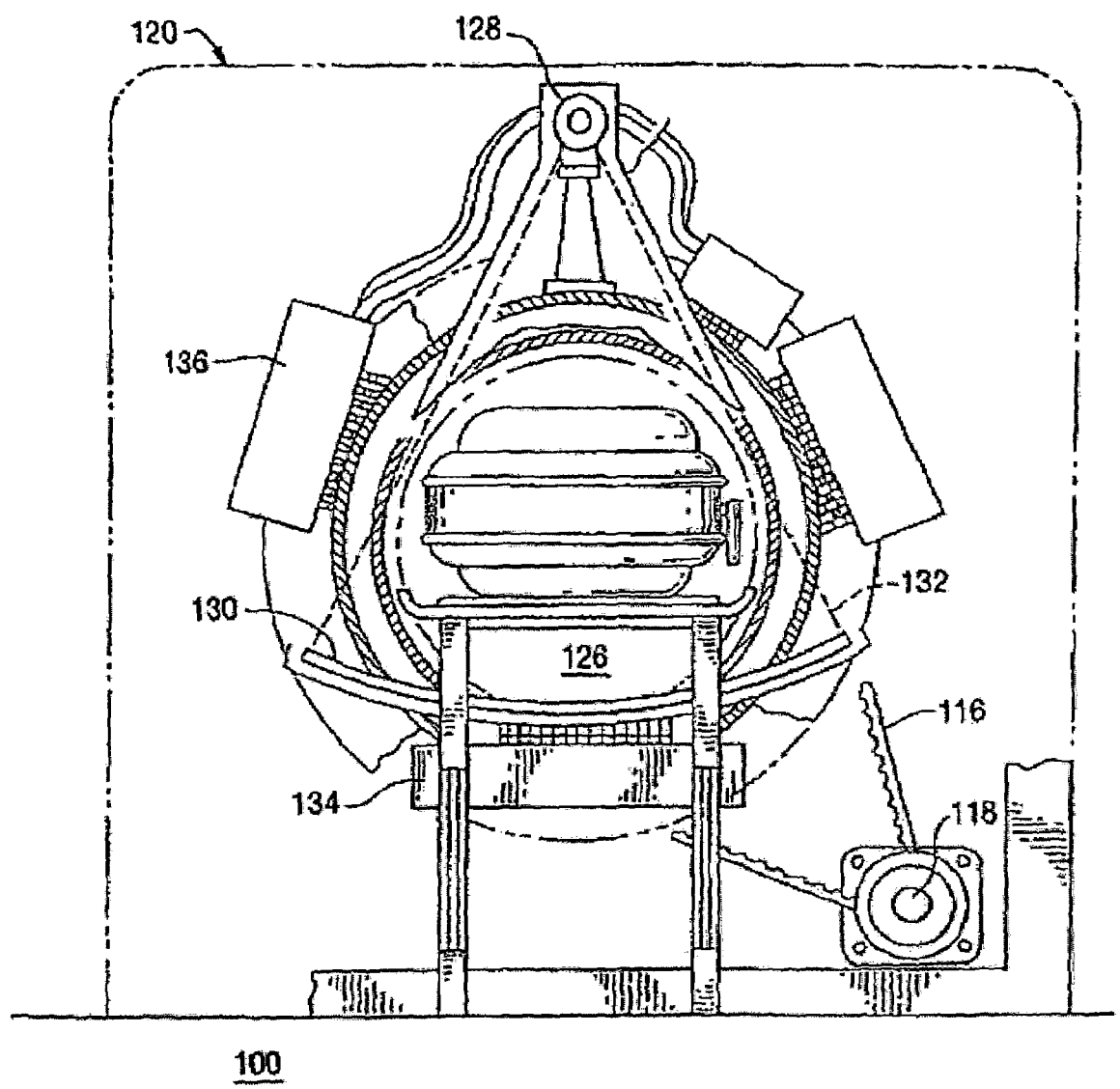
FIG. 2 is a cross-sectional end view of the system of FIG. 1.
Figure 3:
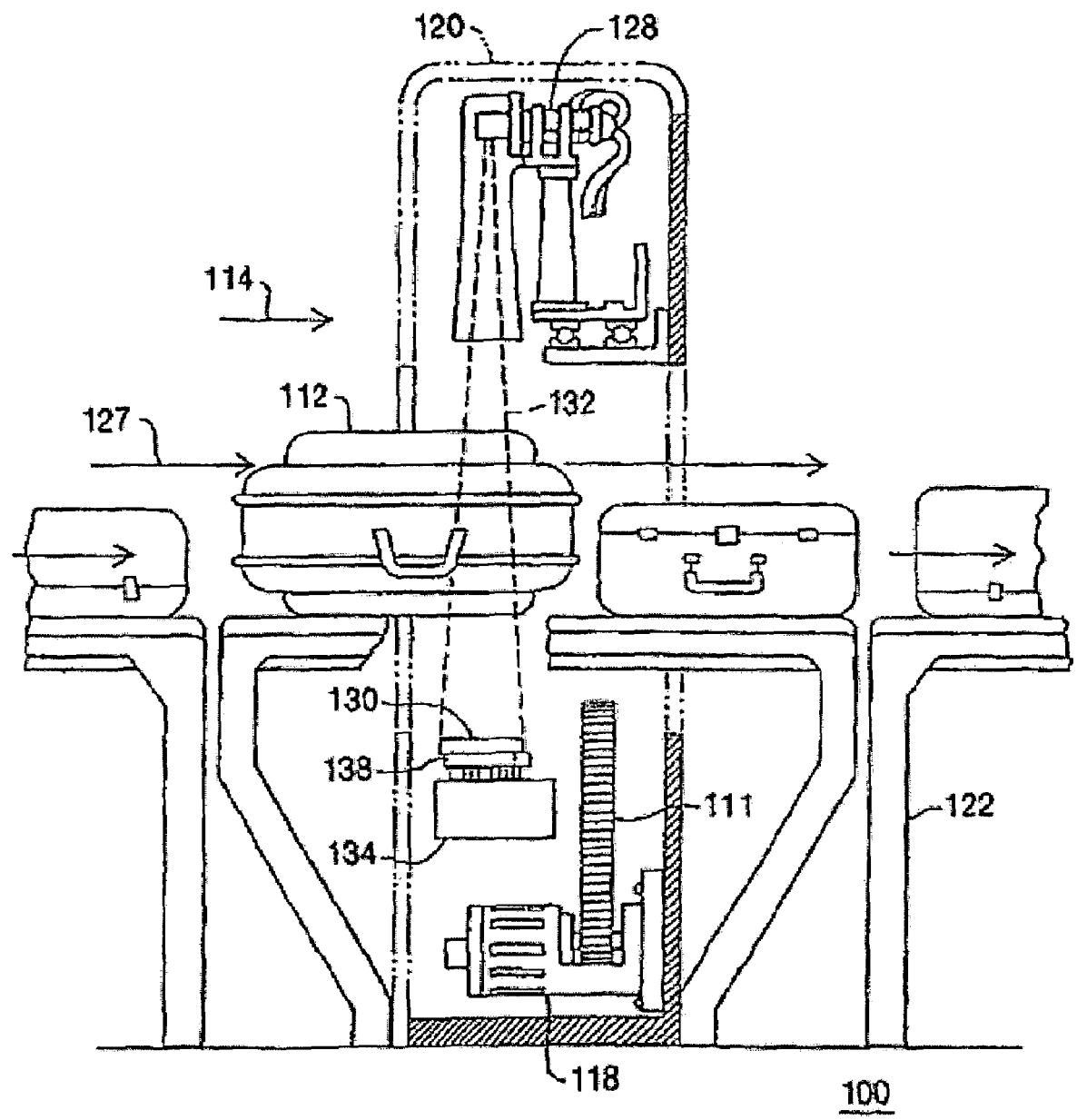
FIG. 3 is a cross-sectional radial view of the system of FIG. 1.
Figure 4:
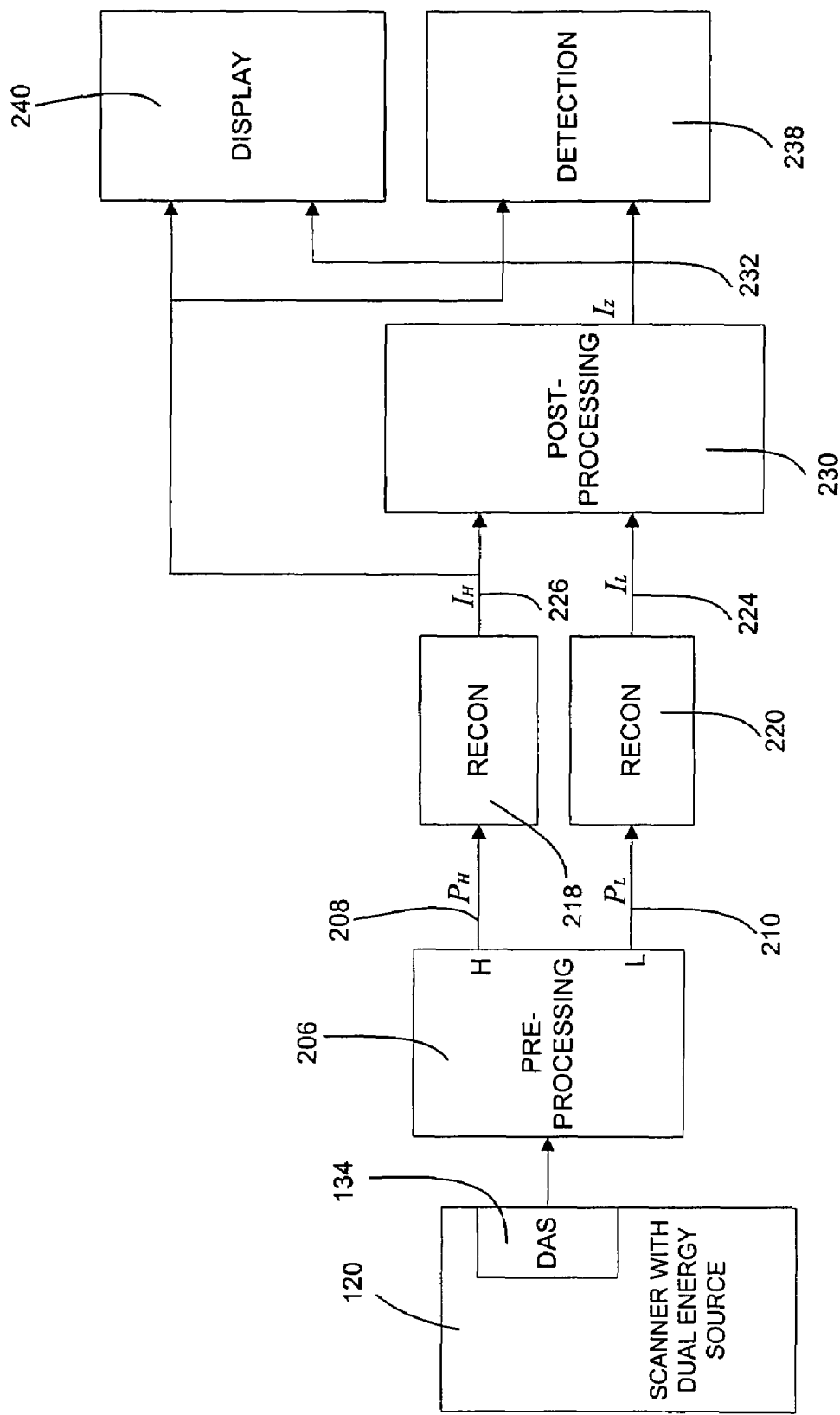
FIG. 4 is a signal flow diagram of a system capable of performing post-reconstruction analysis, useful in the system of FIG. 1.
Figure 5:
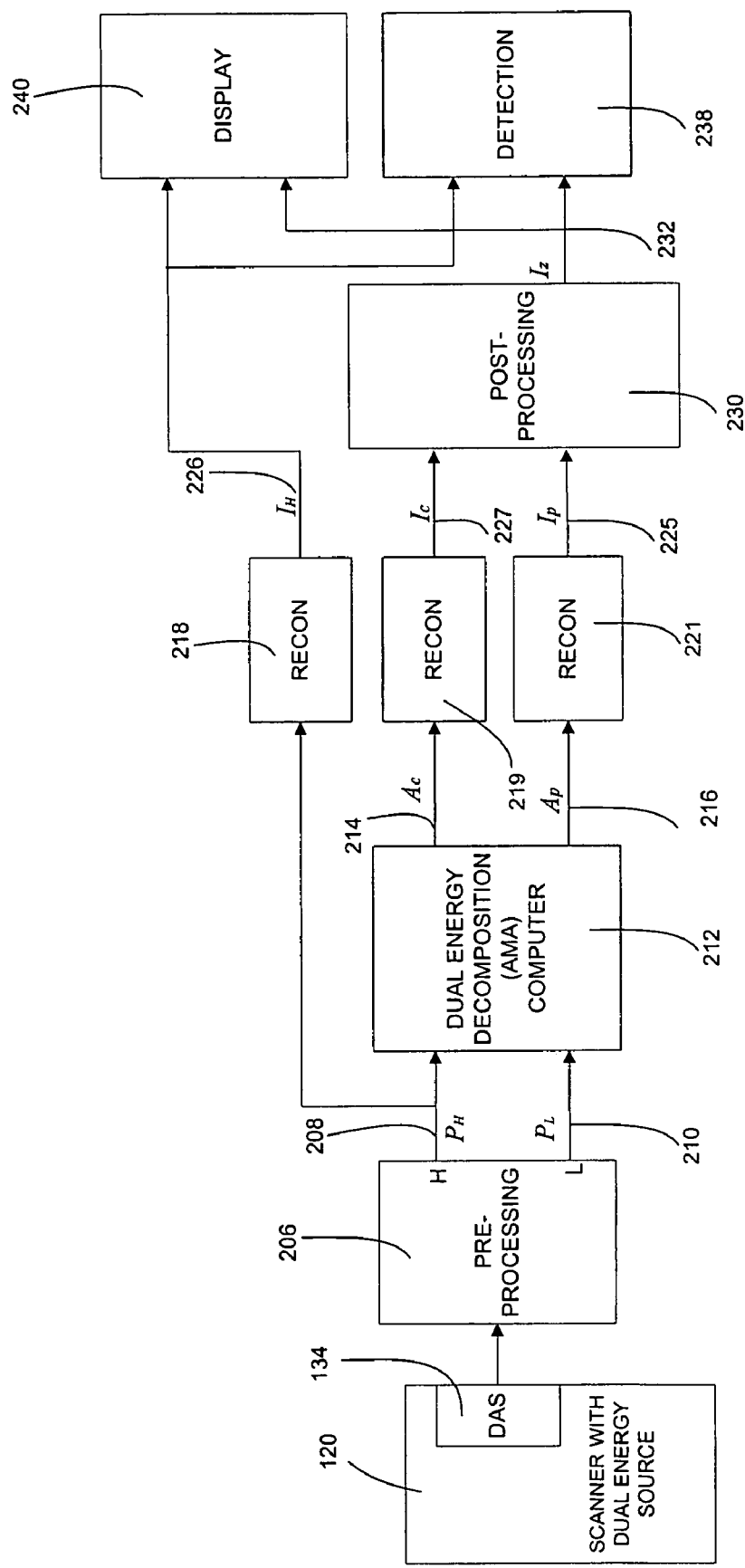
FIG. 5 is a signal flow diagram of a system capable of performing pre-reconstruction analysis, useful in the system of FIG. 1.

In accordance with the present disclosure, a preferred algorithm for destreaking the photoelectric images in multi-energy X-ray CT scanners is provided. For illustrative purposes, this embodiment is described with respect to a CT scanner with an x-ray source and detector configuration, such as that shown and described with respect to FIGS. 1, 2, and 3. The algorithm for destreaking the photoelectric image preferably comprises the following steps:

Generating photoelectric projections;
For each photoelectric projection data point
  Computing the mean and the standard deviation for each photoelectric projection data point;
  Calculating an upper limit and a lower limit using computed mean and standard deviation;
  Detecting outliers using the upper and lower limits;
  Replacing outliers with the upper or lower limit; and
Reconstructing the photoelectric image.

Figure 7:
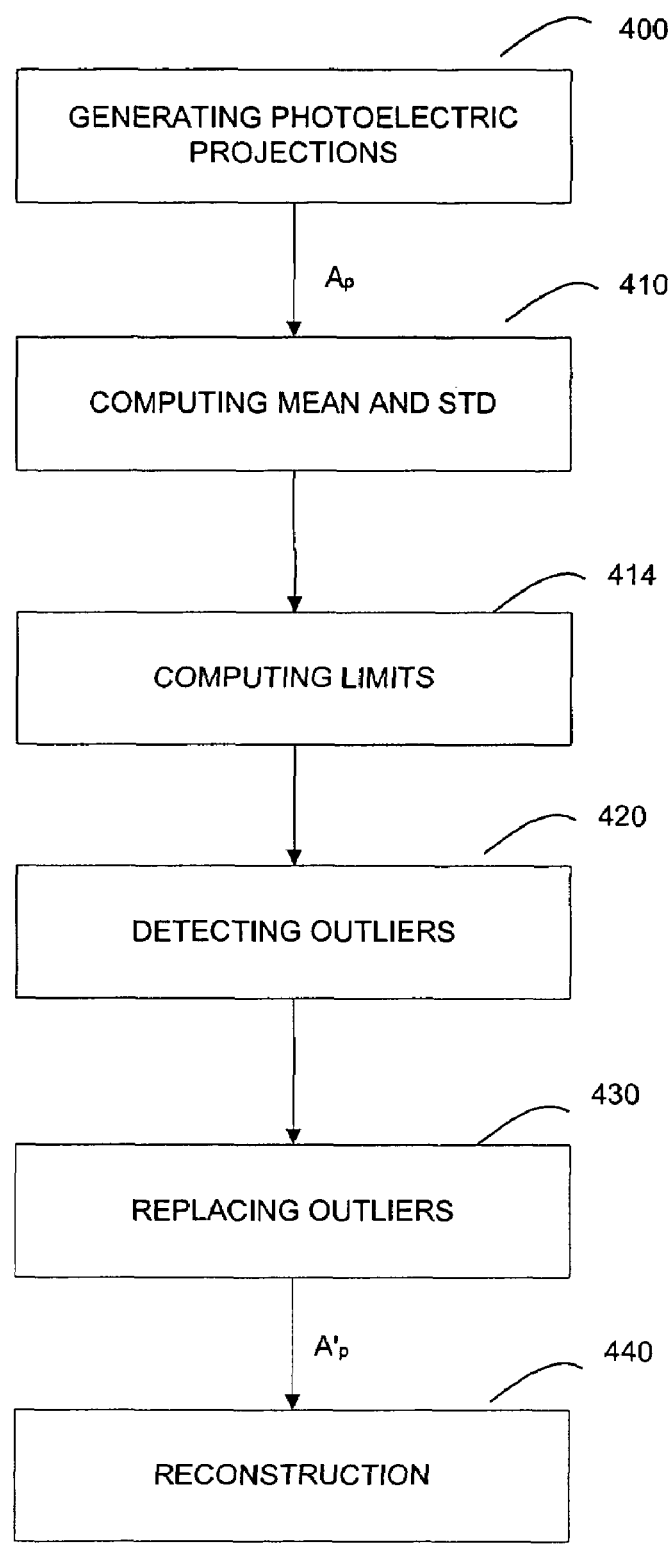
FIG. 7 contains a top-level flow diagram which illustrates the logical flow of one embodiment of destreaking the photoelectric image of the present disclosure.

FIG. 7 contains the flow chart of the preferred method in accordance with present disclosure, and is used preferably to describe the details of the method. In Step 400, the photoelectric projections are produced through a pre-reconstruction dual energy decomposition method such as described in the assignees' "Method of and system for computing effective atomic number image in multi-energy computed tomography" by Zhengrong Ying, et. al. U.S. application Ser. No. 10/850,910, filed on May 21, 2004, incorporated herein by reference, and described in the assignees' "Decomposition of Multi-Energy Scan Projections using Multi-Step Fitting" by Naidu, et. al. U.S. application Ser. No. 10/611,572, filed on Jul. 1, 2003, incorporated herein by reference.

Figure 8:
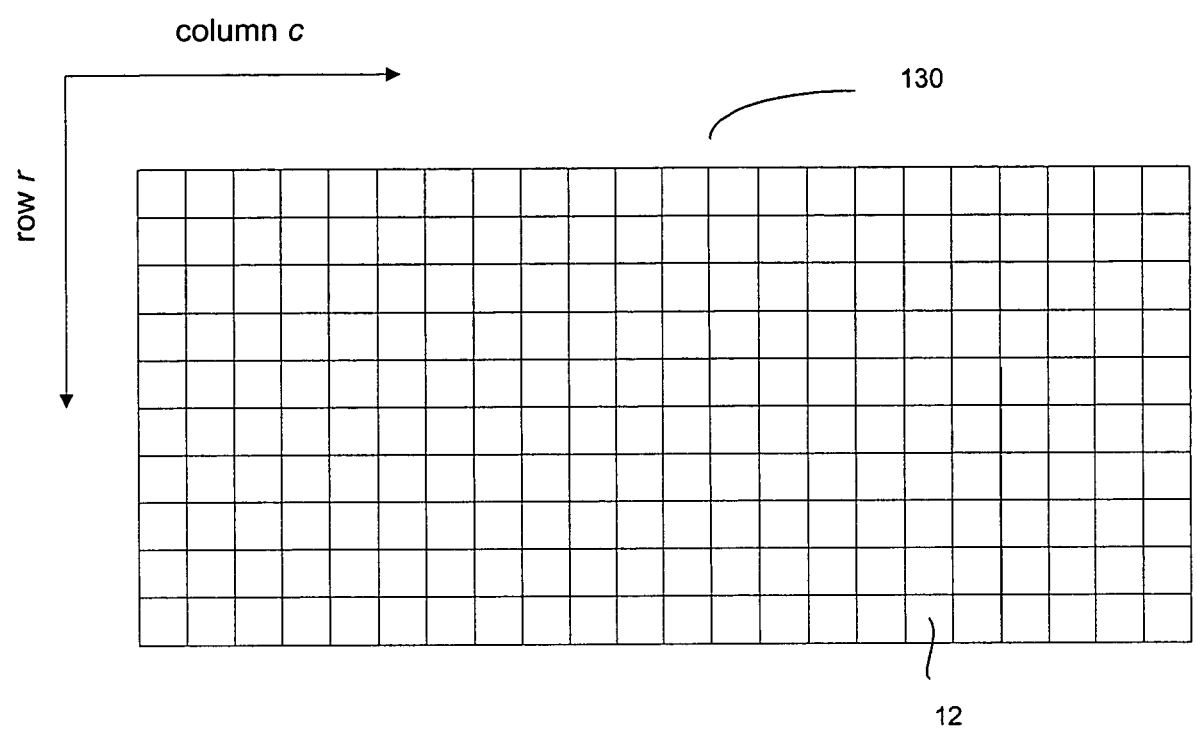
FIG. 8 illustrates a detector array of the present disclosure, useful in the system of FIG. 1.

The generated photoelectric projections, denoted by $A_p(r,c,v)$, have three dimensions. The first two dimensions are along the detector row and column, and the third dimension is along the view angle. FIG. 8 shows a detector array 130 comprising a two-dimensional matrix of detectors, each individual detector being denoted at 12. Let c, $0 \leq c \leq C-1$ denote the index of the column of detector array and r, $0 \leq r \leq R-1$ denote the index of the row detector array, which are shown as the horizontal direction and vertical direction respectively in FIG. 8. In addition let v, $0 \leq v \leq V-1$ denote the view index. C is the number of columns of the detector array, and R is the number of rows of the detector array, and V is the total number of views, which depends on the length of scanned objects.

The streak artifacts exhibited in the photoelectric image correspond to outliers in the photoelectric projections, thus the destreaking algorithm is an outlier removal process in the projection data. Outliers are the data points which are statistically different than their neighboring data points.

Figure 9:
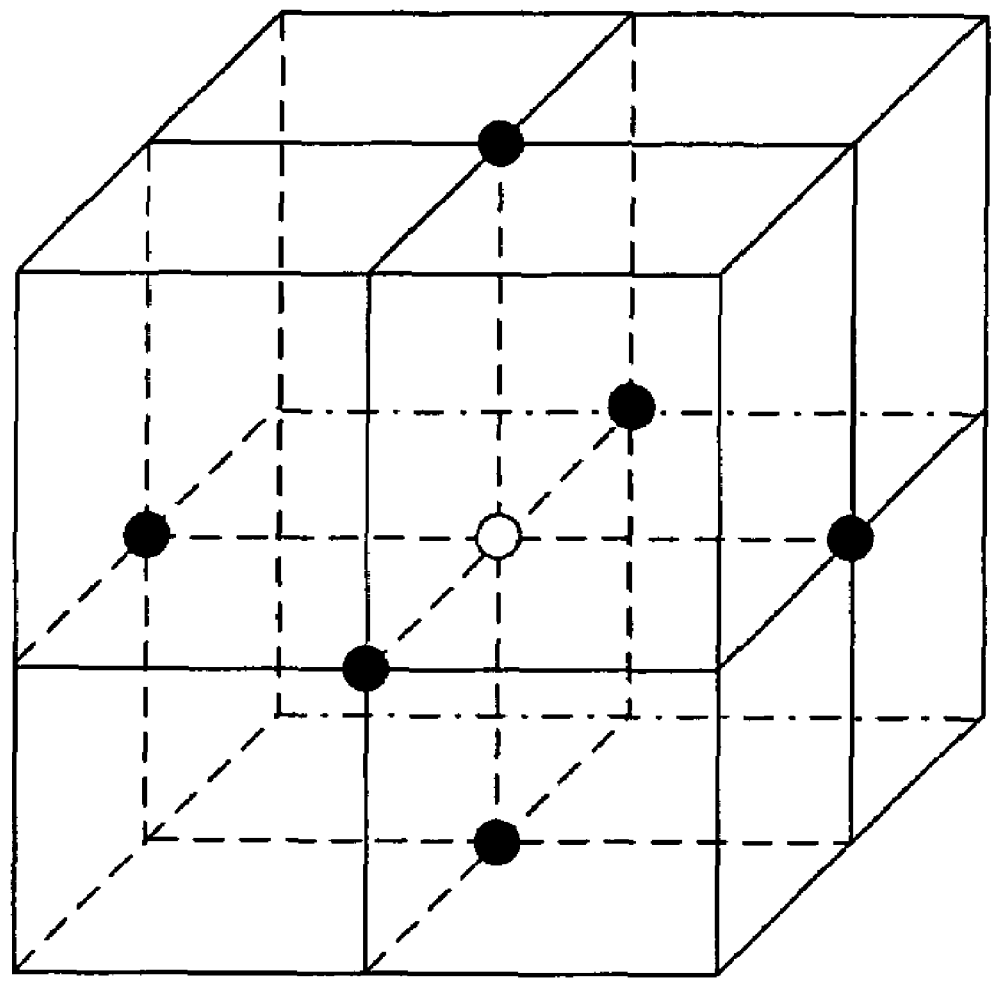
FIG. 9 illustrates a six-surface-neighbor scheme of the present disclosure.
Figure 9:
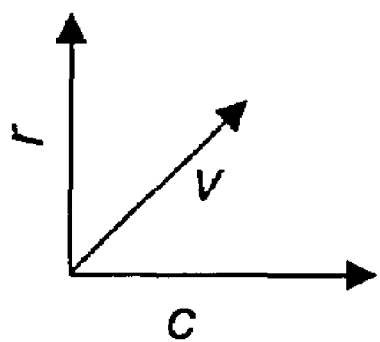

The six-surface-neighbor scheme is preferably used to compute the statistics. The six surface neighbors of a data point with index (r,c,v) are the data points with only +1 or −1 change in one of the three indexes as illustrated in FIG. 9. In FIG. 9, the circle in the middle represents the data point with index (r,c,v), and the six dots on the surface of cube are the six neighbors. Denote N(r,c,v) as the set containing the six surface neighbors of the data point (r,c,v), and it can be mathematically defined as follows, $$N(r,c,v) = \{(r',c',v'): |r'-r|+|c'-c|+|v'-v|=1\}$$

Referring again to FIG. 7, the statistics computed from the six surface neighbors are the mean and the standard deviation in Step 410. $\overline{A}_p(r,c,v)$ is denoted as the mean, and $\sigma(r,c,v)$ is denoted as the standard deviation. They are preferably computed as follows, $$\overline{A}_p(r,c,v) = \frac{1}{6} \sum_{(r',c',v') \in N(r,c,v)} A_p(r',c',v')$$

$$\sigma(r,c,v) = \sqrt{\frac{1}{6} \sum_{(r',c',v') \in N(r,c,v)} [A_p(r',c',v') - \overline{A}_p(r,c,v)]^2}$$

A border replication scheme is preferably used for dealing with boundary conditions, for example, $$A_p(r,c,v) = A_p(0,c,v) \text{ for } r<0,$$

$$A_p(r,c,v) = A_p(R-1,c,v) \text{ for } r \geq R$$

The above rule applies to other indexes as well.

Next in Step 414, an upper limit U(r,c,v) and a lower limit L(r,c,v) are computed from the mean and standard deviation as follows, $$U(r,c,v) = \overline{A}_p(r,c,v) + \sigma(r,c,v)T$$

$$L(r,c,v) = \overline{A}_p(r,c,v) - \sigma(r,c,v)T$$

where T is a constant and its value is experimentally determined. For example, T=0.1 yields satisfactory results in the assignee's system as described before, although clearly other values of T can be used.

Next in Step 420, the following criterion is used for detecting if $A_p(r,c,v)$ is an outlier, $$A_p(r,c,v) < L(r,c,v) \text{ or } A_p(r,c,v) > U(r,c,v)$$

Next in Step 430, the photoelectric projection values of detected outliers are replaced. Denote $A'_p(r,c,v)$ as the output of the destreaking algorithm, and it is computed as follows, $$A'_p(r,c,v) = \begin{cases} U(r,c,v), & \text{if } A_p(r,c,v) > U(r,c,v) \\ L(r,c,v), & \text{if } A_p(r,c,v) < U(r,c,v) \\ A_p(r,c,v), & \text{otherwise} \end{cases}$$

Next in Step 440, the destreaked photoelectric projections are sent to a reconstruction computer to reconstruct photoelectric images. The method described in U.S. Pat. No. 5,802,134 (Larson, et al.), and incorporated herein by reference, is preferably used to for reconstructing the photoelectric images. The reconstructed photoelectric image is then used with the high energy CT image to compute a Z (effective atomic number) image for displaying and detection.

Figure 10:
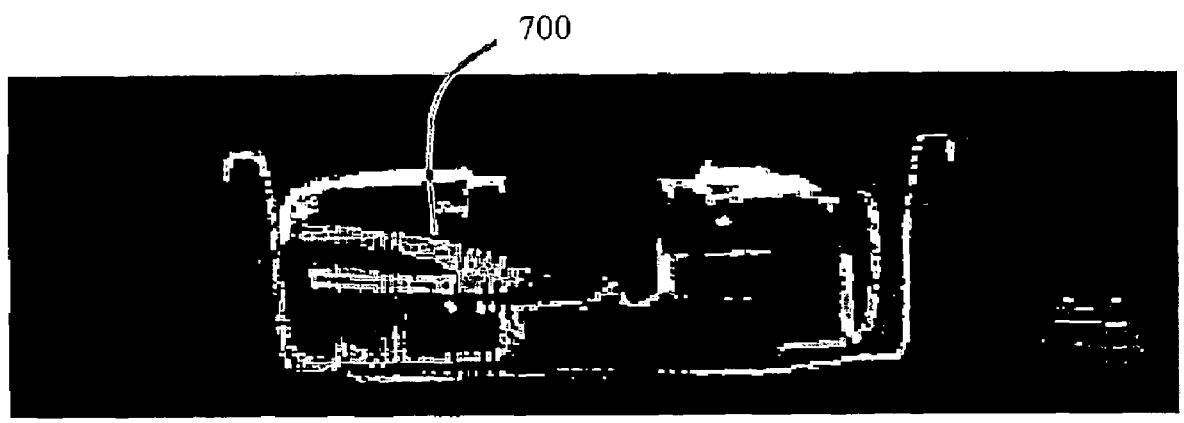
FIG. 10 shows a Z image of a boom box without the destreaking algorithm of the present disclosure.
Figure 11:
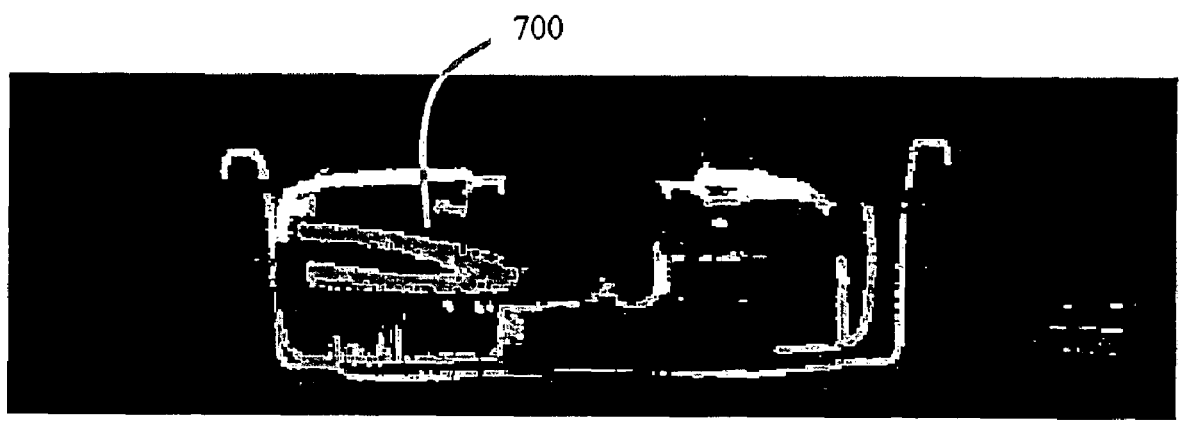
FIG. 11 shows a Z image of a boom box with the destreaking algorithm of the present disclosure.

FIG. 10 shows a Z image of a simulated sheet explosive 700 inside a radio before destreaking and FIG. 11 shows the corresponding Z image after destreaking. The images demonstrate that the destreaking algorithm reduces the streak artifacts in the Z image and increases the conspicuity of the simulated sheet explosive.

The above described algorithm from Step 410 to Step 430 can be recursively applied on the photoelectric projections a plurality of times until the desired results are achieved. The value of T and the definition of the neighboring scheme N(r,c,v) can be different for each iteration.

A system for destreaking the photoelectric image that includes subsystems configured to implement the above functionality may also be provided. Such a system may include subsystems for generating photoelectric projections, computing statistics from neighbors, calculating upper and lower limits, detecting outliers, replacing outliers, and reconstructing photoelectric images. Such a destreaking system could be employed as the destreaking unit 250 shown in the system of FIG. 6.

While this disclosure has been particularly shown and described with references to preferred embodiments thereof, it will be understood by those skilled in the art that various changes in form and details may be made therein without departing from the spirit and scope of the disclosure as defined by the following claims. Such variations include using different neighboring schemes, such as an eight-corner-neighbor scheme, a 12-edge-neighbor scheme, and an all 26 neighbors in a 3 by 3 by 3 cube.

The invention claimed is:

1. A method of destreaking photoelectric images reconstructed from a set of three-dimensional photoelectric projection data points obtained from a two-dimensional detector array at multiple view angles in multi-energy X-ray computed tomography, wherein a neighboring scheme is provided, for each photoelectric projection data point, the method comprising:
   A. Computing the mean and the standard deviation of the neighbors defined by the neighboring scheme;
   B. Calculating an upper limit and a lower limit from the computed mean and standard deviation as a function of a pre-determined constant, including:
      B1. Calculating a product of the standard deviation and the pre-determined constant;
      B2. Calculating an upper limit as a function of adding the product calculated in Step B1 to the mean; and
      B3. Calculating the lower limit as a function of subtracting the product calculated in Step B1 from the mean;
   C. Detecting if said photoelectric projection data point is an outlier using the calculated upper and lower limits; and
   D. Replacing the detected outliers with a replacement data point calculated as a function of said mean and standard deviation of said neighboring data points corresponding to the detected outlier.

2. The method of claim 1, wherein the said neighboring scheme includes determining six data points which are on the six surfaces of a three by three cube centered by said photoelectric projection data point.

3. The method of claim 1, wherein said replacements data point is the upper limit if the photoelectric value of the outlier point is greater than the upper limit and is the lower limits if the photoelectric value of the outlier point is less than the lower limit.

4. A system for destreaking photoelectric images reconstructed from a set of three-dimensional photoelectric projection data points obtained from a two-dimensional detector array at multiple view angles in multi-energy X-ray computed tomography, wherein a neighboring scheme is provided, the system comprising:
   A. A computation subsystem constructed and arranged so as to compute the mean and the standard deviation of the neighbors defined by the neighboring scheme;
   B. A calculation subsystem constructed and arranged so as to calculate an upper limit and a lower limit from the computed mean and standard deviation as a function of a pre-determined constant, the calculation subsystem being constructed and arranged so as to:
      B1. Calculate a product of the standard deviation and the pre-determined constant;
      B2. Calculate the upper limit by adding the product calculated in Step B1 to the mean; and
      B3. Calculate the lower limit by subtracting the product calculated in Step B1 from the mean.
   C. A detection subsystem constructed and arranged so as to detect whether said photoelectric projection data point is an outlier using the calculated upper and lower limits; and
   D. A replacement subsystem is constructed and arranged so as to replace the detected outlier with a replacement projection data point calculated as a function of the mean and standard deviation of said neighboring data points corresponding to the detected outlier.

5. The system of claim 4, wherein the said neighboring scheme includes six data points which are on the six surfaces of a three by three cube centered by the photoelectric projection data point.

6. The system of claim 4, wherein said replacement projection data points is the upper limit if the photoelectric value of the outlier point is greater than the upper limit, and is the lower limit if the photoelectric value of the outlier point is less than the lower limit.

* * * * *